United States Patent
Crawford et al.

(10) Patent No.: US 11,293,503 B2
(45) Date of Patent: Apr. 5, 2022

(54) SPRING APPLIED HYDRAULIC RELEASED BRAKE

(71) Applicant: Ausco Products, Inc., Benton Harbor, MI (US)

(72) Inventors: Norman D. Crawford, St. Joseph, MI (US); Jeromy A. Hoar, Mount Vernon, OH (US); Brian P. Dennis, Kalamazoo, MI (US); Kenneth A. Dodd, Dowagiac, MI (US); LynRoy T. Palmer-Coleman, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 167 days.

(21) Appl. No.: 16/561,228

(22) Filed: Sep. 5, 2019

(65) Prior Publication Data

US 2020/0080602 A1    Mar. 12, 2020

Related U.S. Application Data

(60) Provisional application No. 62/728,122, filed on Sep. 7, 2018, provisional application No. 62/728,285, filed
(Continued)

(51) Int. Cl.
*F16D 65/14* (2006.01)
*F16D 55/227* (2006.01)
(Continued)

(52) U.S. Cl.
CPC ......... *F16D 55/227* (2013.01); *F16D 55/228* (2013.01); *F16D 65/0056* (2013.01);
(Continued)

(58) Field of Classification Search
CPC .. F16D 55/2265; F16D 59/02; F16D 65/0093; F16D 65/0087; F16D 65/0043;
(Continued)

(56) References Cited

U.S. PATENT DOCUMENTS 3,547,233 A * 12/1970 Girvan ...................... B60T 7/02
   188/170
3,944,027 A * 3/1976 Yamamoto .............. F16D 65/18
   188/71.9
(Continued)

FOREIGN PATENT DOCUMENTS

DE    19636943 A1 *  3/1998   ........... F16D 65/568
DE  102012220679 A1 *  5/2014   ............. F16D 55/36

OTHER PUBLICATIONS

Disc Brake Pads; http://www.absfriction.com/disc; Wayback Machine archive http://web.archive.org/web/20141016201951/http://www.absfriction.com/disc; publication date: Oct. 16, 2014.
(Continued)

*Primary Examiner* — Robert A. Siconolfi
*Assistant Examiner* — Stephen M Bowes
(74) *Attorney, Agent, or Firm* — Renner Kenner Greive Bobak Taylor & Weber

(57) ABSTRACT

A spring applied hydraulic released brake includes a brake housing including a pair of stator assemblies, a pair of piston-spring assemblies, each of the piston-spring assemblies including a piston assembly, a spring assembly adapted to apply spring force to the piston assembly to thereby engage the piston assembly with a first stator assembly of the pair of stator assemblies in a default position of the brake, and an end cap adjuster providing an opposing surface against which the spring assembly is biased, the end cap adjuster including a body portion having an end cap threading therearound generally corresponding with a housing threading within the brake housing.

9 Claims, 12 Drawing Sheets

Related U.S. Application Data on Sep. 7, 2018, provisional application No. 62/728,448, filed on Sep. 7, 2018.

(51) Int. Cl.

| | | |
|---|---|---|
| *F16D 66/02* | (2006.01) | |
| *F16D 65/44* | (2006.01) | |
| *F16D 65/00* | (2006.01) | |
| *F16D 65/18* | (2006.01) | |
| *F16D 65/092* | (2006.01) | |
| *F16D 65/095* | (2006.01) | |
| *F16D 55/228* | (2006.01) | |
| *F16D 121/06* | (2012.01) | |
| *F16D 55/00* | (2006.01) | |
| *F16D 65/38* | (2006.01) | |
| *F16D 121/04* | (2012.01) | |
| *F16D 127/02* | (2012.01) | |
| *F16D 125/06* | (2012.01) | |
| *F16D 125/08* | (2012.01) | |
| *F16D 125/10* | (2012.01) | |

(52) U.S. Cl.
CPC ....... *F16D 65/0068* (2013.01); *F16D 65/092* (2013.01); *F16D 65/095* (2013.01); *F16D 65/183* (2013.01); *F16D 65/44* (2013.01); *F16D 66/02* (2013.01); *F16D 2055/0008* (2013.01); *F16D 2055/0016* (2013.01); *F16D 2065/383* (2013.01); *F16D 2121/04* (2013.01); *F16D 2121/06* (2013.01); *F16D 2125/06* (2013.01); *F16D 2125/08* (2013.01); *F16D 2125/10* (2013.01); *F16D 2127/02* (2013.01); *F16D 2250/0069* (2013.01); *F16D 2250/0084* (2013.01)

(58) Field of Classification Search
CPC .. F16D 66/02; F16D 2125/04; F16D 2125/06; F16D 2123/00; F16D 2121/06; F16D 2121/12; F16D 2069/0491; F16D 2065/383; F16D 2125/08; F16D 65/18
See application file for complete search history.

(56) References Cited

U.S. PATENT DOCUMENTS

| | | | | |
|---|---|---|---|---|
| 4,192,405 | A * | 3/1980 | Lee | F16D 55/224 188/170 |
| 4,245,724 | A * | 1/1981 | Beck | F16D 55/40 188/170 |
| 4,527,667 | A * | 7/1985 | Courbot | F16D 55/2265 188/73.34 |
| 5,111,915 | A * | 5/1992 | Rupprecht | F16D 55/227 188/71.1 |
| 5,363,944 | A * | 11/1994 | Thiel | F16D 55/227 188/250 G |
| 5,441,128 | A * | 8/1995 | Hoyt | F16D 65/60 188/1.11 W |
| 7,597,178 | B2 | 10/2009 | Dennis et al. | 188/72.4 |
| 7,963,373 | B2 * | 6/2011 | Salazar | F16D 66/00 188/1.11 W |
| 8,127,897 | B2 * | 3/2012 | Baldeosingh | F16D 59/02 188/72.3 |
| 8,272,484 | B1 | 9/2012 | Dennis et al. | 188/72.5 |
| 2006/0076195 | A1 * | 4/2006 | Salazar | F16D 66/02 188/1.11 R |
| 2013/0062149 | A1 * | 3/2013 | Burgoon | F16D 55/227 188/72.3 |

OTHER PUBLICATIONS

Bendix® Fleet Metlok®; http://www.bendix-brakes.com/bendix_fleet_metlok.php; Wayback Machine archive http://web.archive.org/web/20151112093106/http://www.bendix-brakes.com/bendix_fleet_metlok.php; publication date: Nov. 12, 2015.

Mico® Caliper Disc Brakes; https://www.mico.com/products/brakes/caliper-disc-brakes; Wayback machine archive http://web.archive.org/web/20141018053739/https://www.mico.com/products/brakes/caliper-disc-brakes; publication date: Oct. 18, 2014.

Mico® Caliper Disc Brakes Catalog; Form No. 84-515-535; Mar. 31, 2017.

Mico® Caliper Disc Brakes Product Bulletin; Form No. 80-500-007; Oct. 4, 2011.

Brake Pad Chamfers, Slots and Shapes: Controlling Brake Noise; Brake & FrontEnd, Mar. 22, 2017.

* cited by examiner

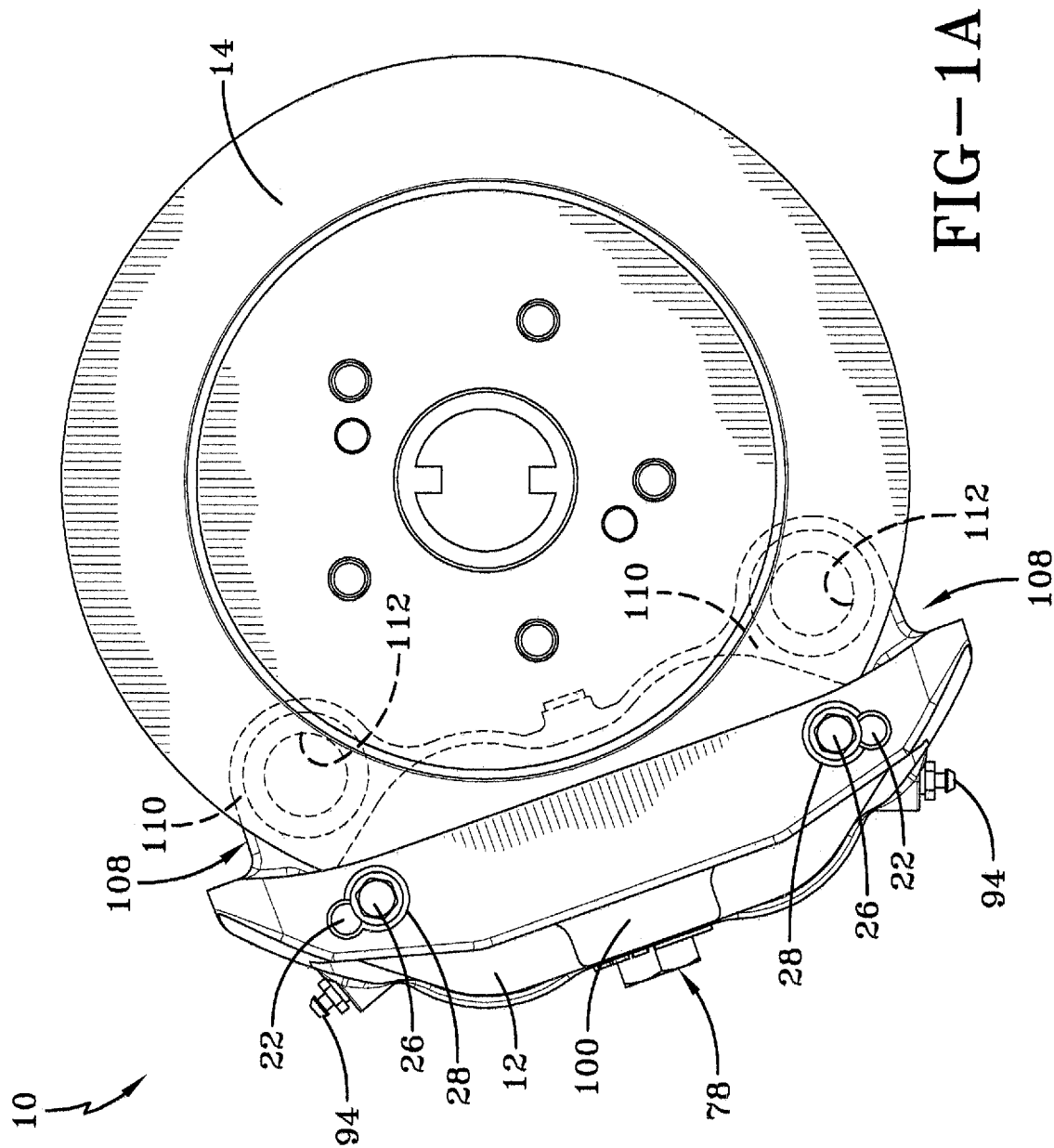

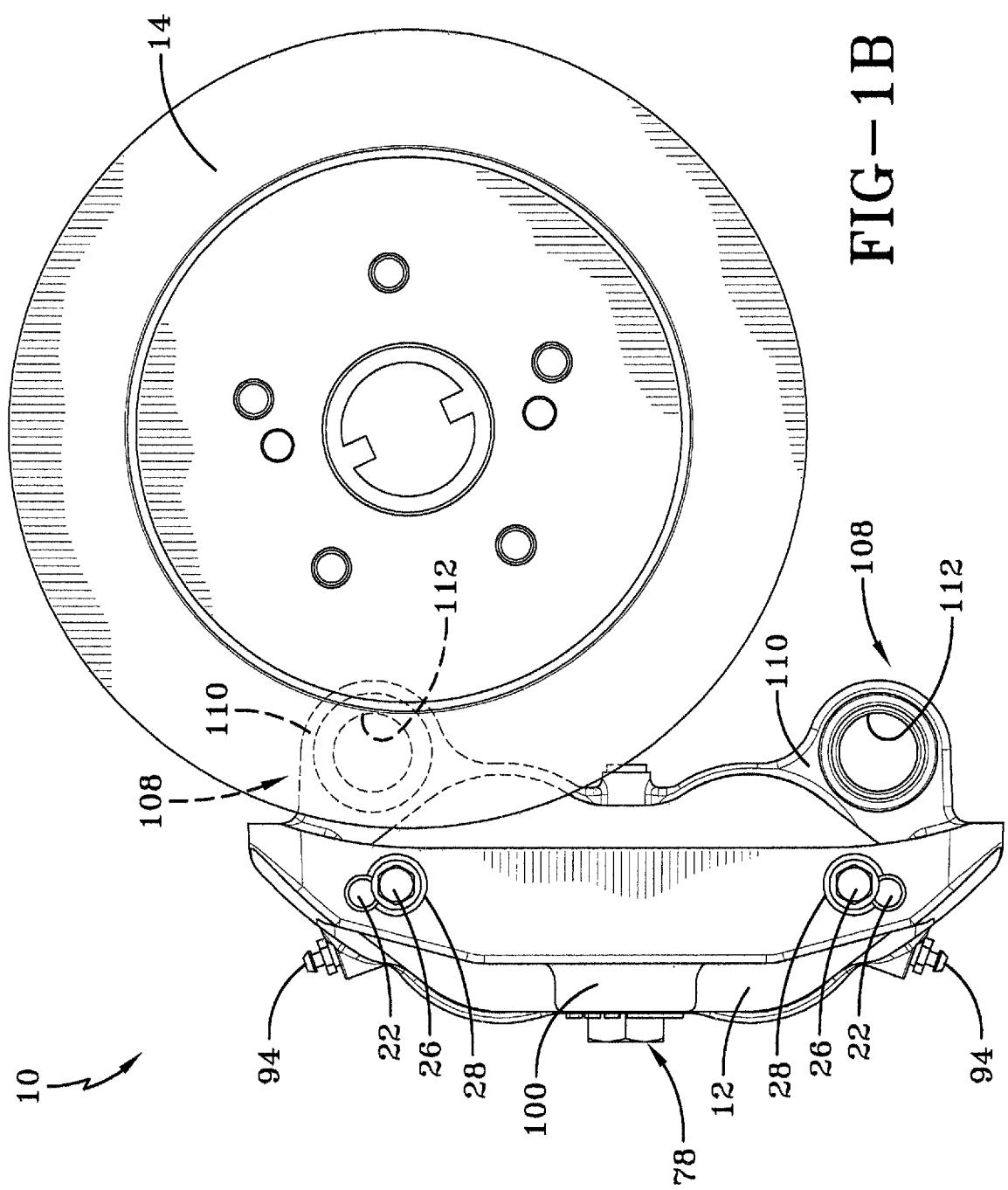

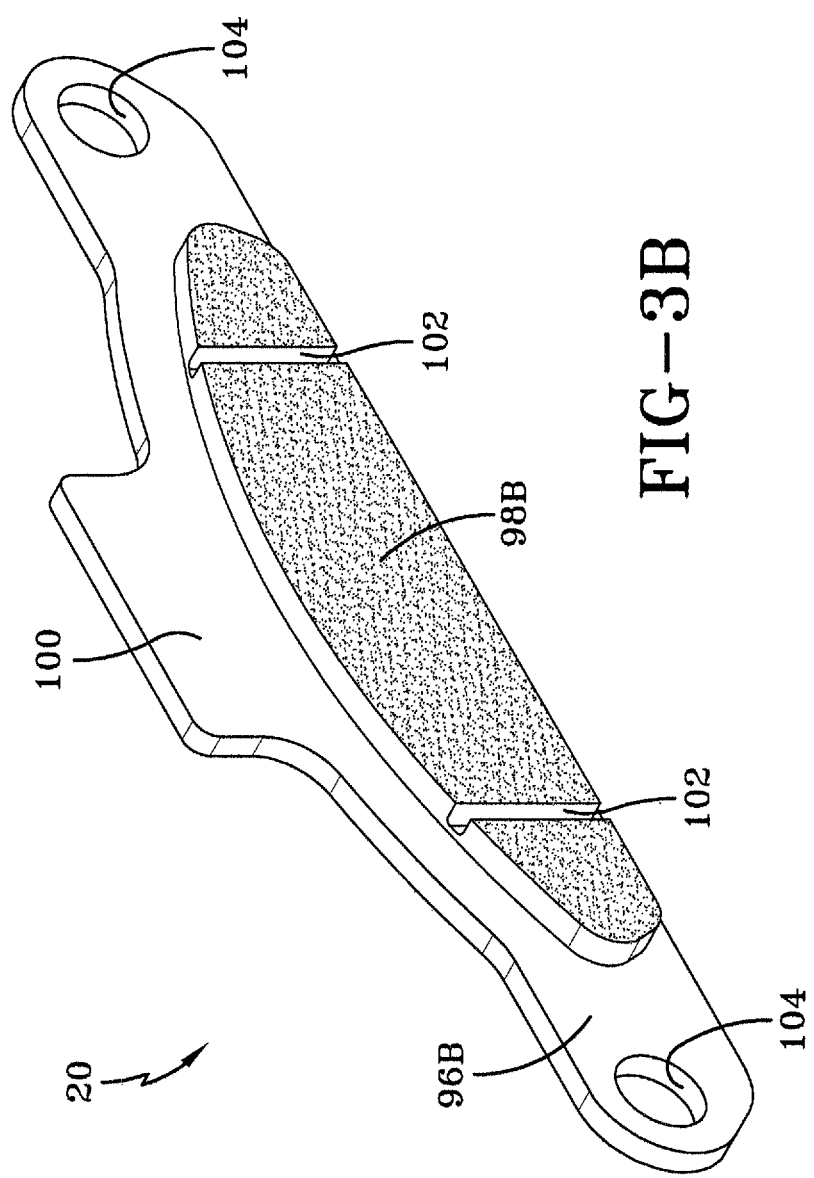

SPRING APPLIED HYDRAULIC RELEASED BRAKE

CROSS REFERENCE TO RELATED APPLICATIONS

This application claims the benefit of U.S. Provisional Application No. 62/728,448, filed Sep. 7, 2018; U.S. Provisional Application No. 62/728,122, filed Sep. 7, 2018; and U.S. Provisional Application No. 62/728,285, filed Sep. 7, 2018, which are each incorporated herein by reference.

TECHNICAL FIELD

This invention relates to a spring applied hydraulic released brake. More particularly, this invention relates to a spring applied hydraulic released brake that can be hung from a mounting bracket, and includes improved stator assemblies and includes a site plug for visual inspection.

BACKGROUND ART

Certain parking brakes include manual pull levers for a drum. These brakes may be of the type generally known as drum-in-hat style brakes. Drum-in-hat style brakes may be undependable in certain applications, particularly those where mining debris may interfere with the components.

Hanging or attempting to hang certain brakes from a bracket can cause interference with the wheel rotor or other wheel end components. This can also require disconnecting hydraulic fittings or hoses in order to hang the brake.

Other problems that are common in certain brakes relate to difficulty with servicing stator assemblies. Handling of the stators is generally a problem, as the stators generally lack a suitable way to get a hold of the stators. Also, it may be difficult to know when the stator pads require replacement.

There remains a need for a spring applied hydraulic released brake that offers one or more improvements over the prior art.

SUMMARY OF THE INVENTION

In general, a spring applied hydraulic released brake and corresponding methods are provided.

In accordance with an aspect of the invention, the spring applied hydraulic released brake may include brake housing including a pair of stator assemblies, a pair of piston-spring assemblies, each of the piston-spring assemblies including a piston assembly, a spring assembly adapted to apply spring force to the piston assembly to thereby engage the piston assembly with a first stator assembly of the pair of stator assemblies in a default position of the brake, and an end cap adjuster providing an opposing surface against which the spring assembly is biased, the end cap adjuster including a body portion having an end cap threading therearound generally corresponding with a housing threading within the brake housing.

It is thus an object of one aspect of the present invention to provide a spring applied hydraulic released brake where the brake is capable of being hung from a mounting bracket without interfering with a rotor or other wheel end components, such as hydraulic fittings or hoses.

It is an object of another aspect of the present invention to provide a spring applied hydraulic released brake, as above, providing an easy and visual way to inspect that the brake requires adjustment.

It is an object of another aspect of the present invention to provide a spring applied hydraulic released brake, as above, providing an easy method to grasp stator assemblies of the brake when service of the stator assemblies is required.

It is an object of another aspect of the present invention to provide a spring applied hydraulic released brake, as above, providing a visual way to indicate when a stator lining of the stator assemblies is worn and requires replacement.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

FIG. 1A is a front view of a spring applied hydraulic released brake showing the brake in position with a wheel rotor and a bracket according to the concepts of the present invention.

FIG. 1B is a front view of the spring applied hydraulic released brake showing the ability to hang the brake from the bracket according to the concepts of the present invention.

FIG. 3B is a perspective view of a second stator assembly of the spring applied hydraulic released brake according to the concepts of the present invention.

DETAILED DESCRIPTION OF THE INVENTION

Figure 1C:
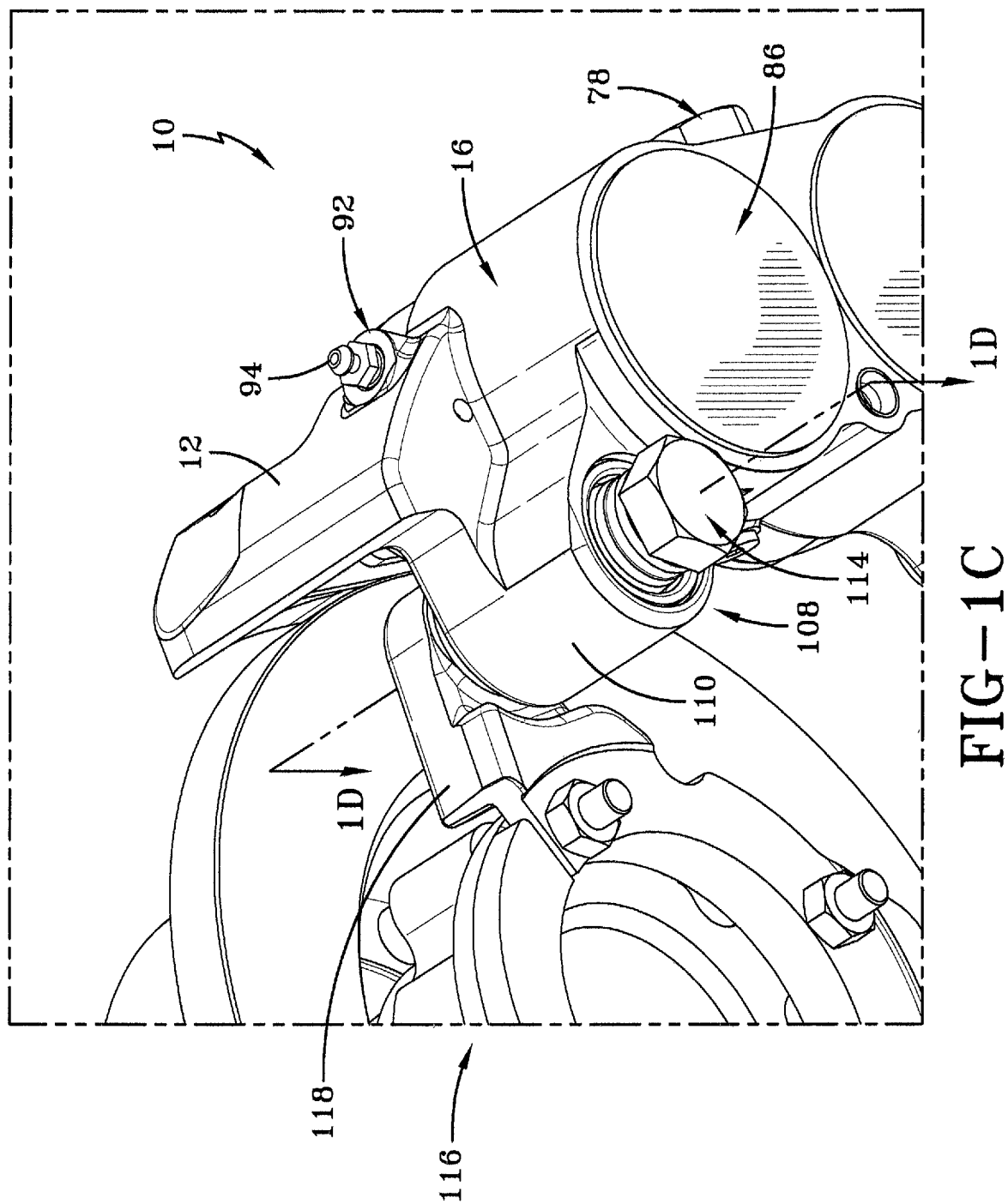
FIG. 1C is a partial perspective view of the spring applied hydraulic released brake showing a mounting assembly of the brake mounted with a bracket assembly according to the concepts of the present invention.

With reference to the Figures, a spring applied hydraulic released (SAHR) brake according to the concepts of the present invention is generally indicated by the numeral 10. SAHR brake 10, which may also be described as spring applied hydraulically released (SAHR) brake 10 or SAHR assembly 10, includes a housing 12 that carries and protects components of SAHR brake 10 and locates SAHR brake 10 in operative relation to a wheel rotor 14, as seen in FIGS. 1A and 1B.

Figure 2A:
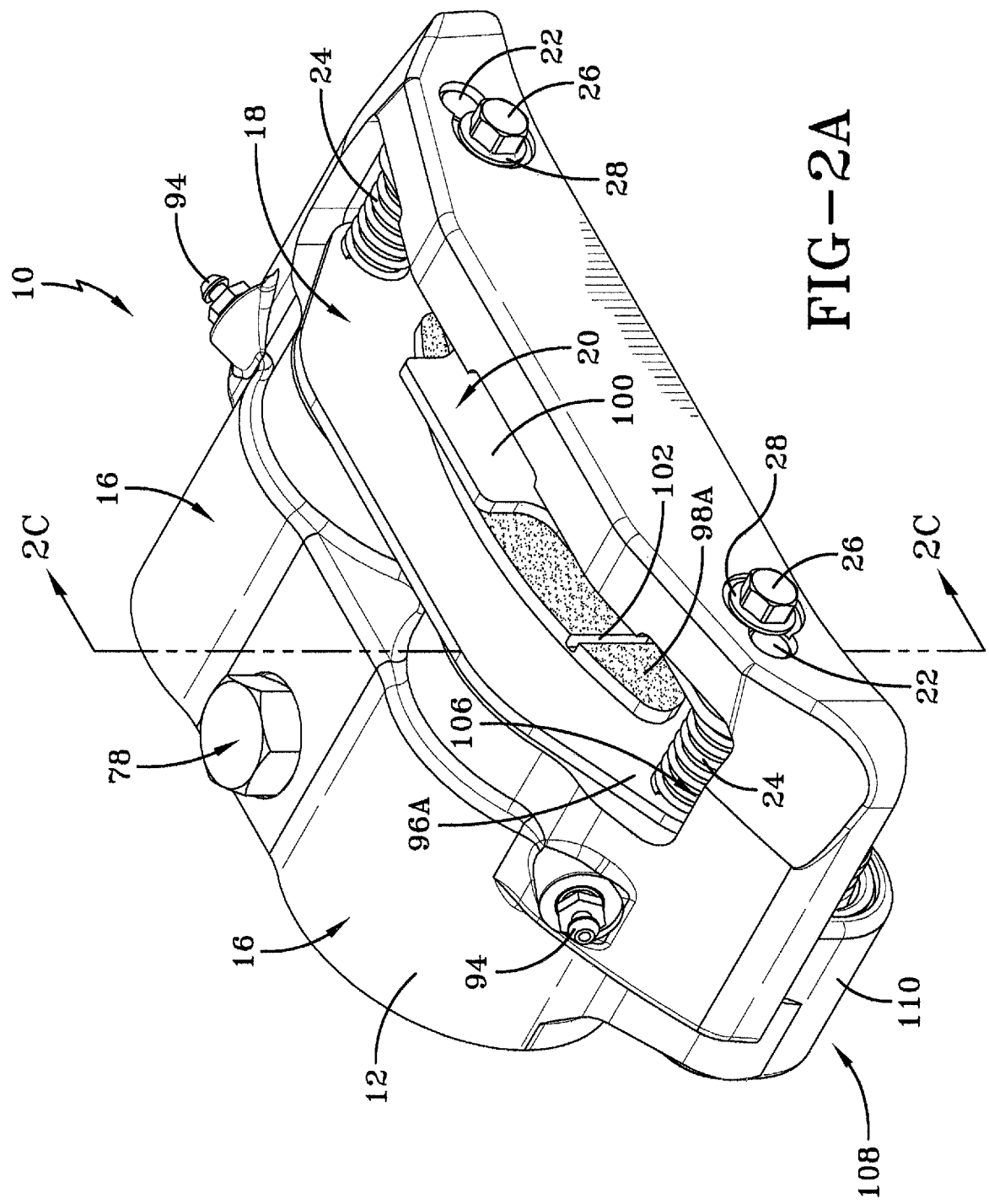
FIG. 2A is a perspective top view of the spring applied hydraulic released brake according to the concepts of the present invention.
Figure 2B:
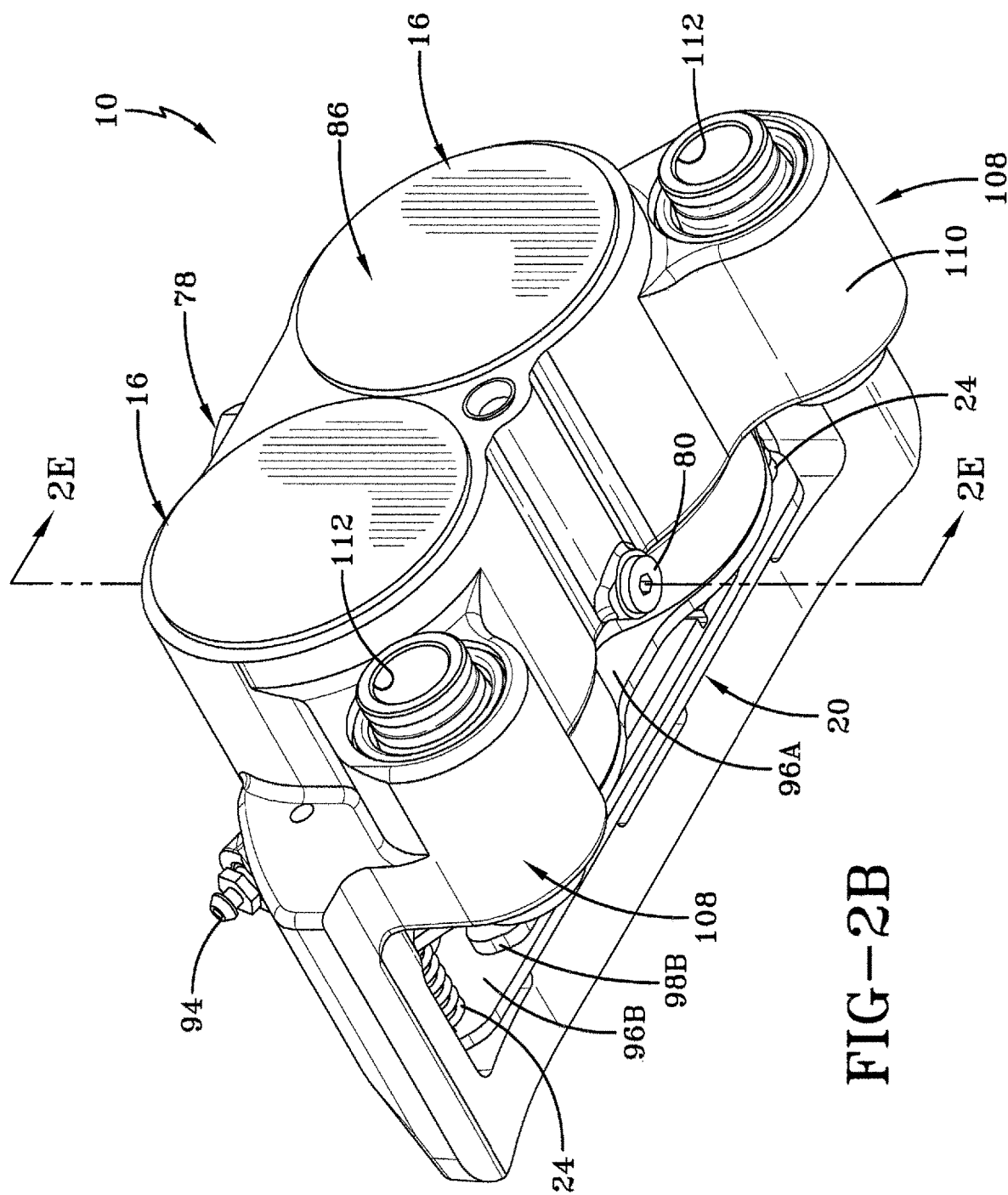
FIG. 2B is a perspective bottom view of the spring applied hydraulic released brake according to the concepts of the present invention.

Housing 12, which may be a unitary, or single, cast component, includes an SAHR assembly in a first portion of housing 12. As best seen in FIGS. 2A and 2B, the SAHR assembly, which includes a pair of piston-spring assemblies 16, engages a first stator assembly 18 to thereby enact a braking function for SAHR brake 10 in a 'default' position of SAHR brake 10. The braking function of SAHR brake 10 is achieved by first stator assembly 18 engaging rotor 14, which further engages a second stator assembly 20 with rotor 14. Said another way, SAHR brake 10 is engaged to prevent rotation of rotor 14 in a default condition of SAHR brake 10.

Figure 1D:
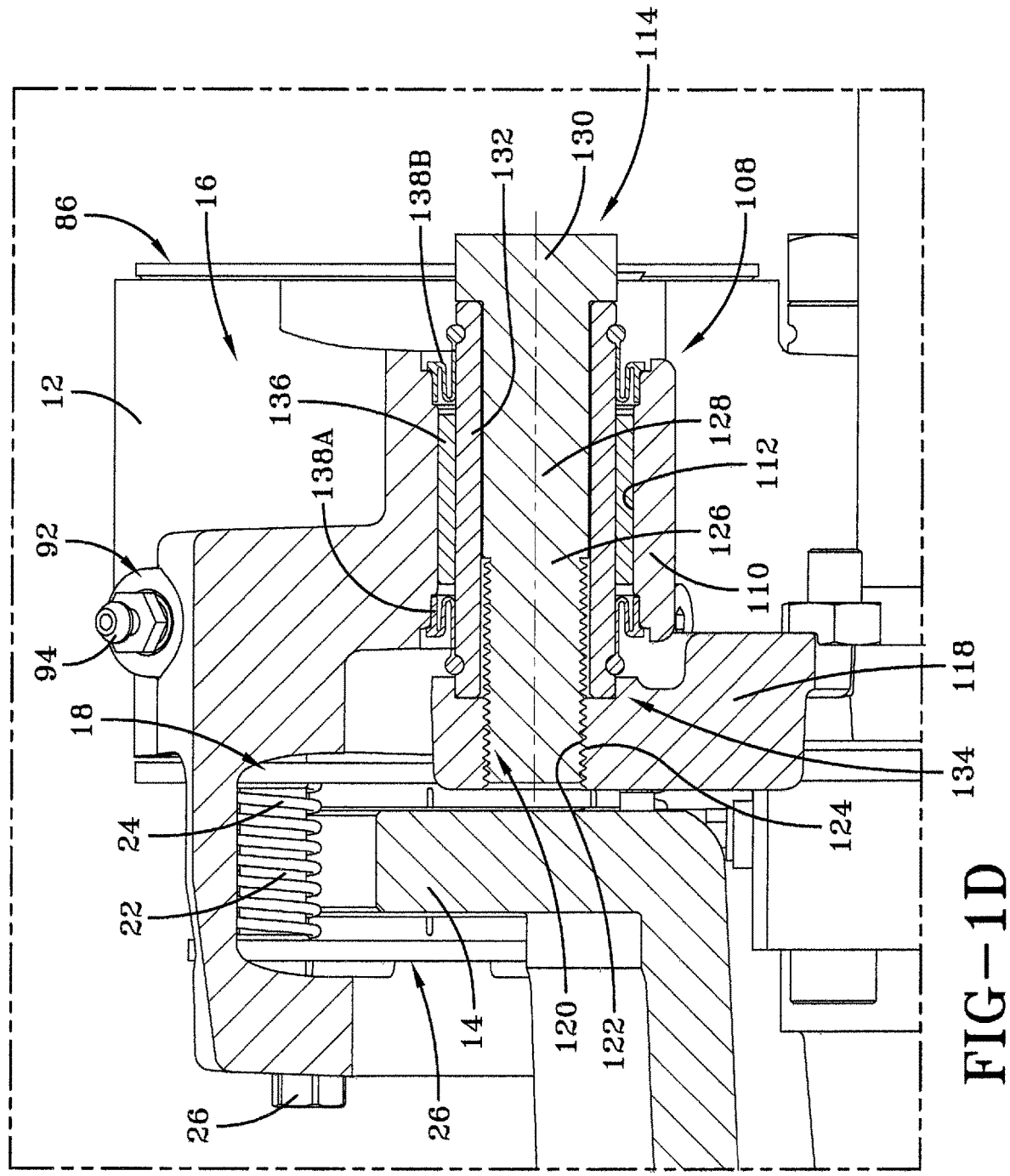
FIG. 1D is a sectional view about line 1D-1D from FIG. 1C, showing a mounting bolt assembly of the spring applied hydraulic released brake according to the concepts of the present invention.

A second portion of housing 12 retains second stator assembly by way of a pair of torque pins 22, which may also be referred to as stator pins 22 or pins 22. Each torque pin 22 may include a respective spring 24 therearound, as seen in FIG. 1D. Pins 22 and springs 24 provide easy access for removal thereof for a user to service SAHR brake 10. Pins 22 are slideably received within respective torque pin holes in housing 12 and are held in place by a respective bolt 26 and a respective washer 28. For securing pin 22, bolt 26 is retained within a threaded hole within housing 12. As seen at least in FIG. 1A, a portion of washer 28 overlaps a portion of pin 22. Bolt 26 may include a common hexagonal head so that a common tool can be used to remove bolts 26. With bolts 26 removed, pins 22 can be subsequently removed by sliding pins 22 out, which removal may or may not be assisted with a suitable tool. Pins 22 provide resistance to the impact of stator assemblies 18, 20 when SAHR brake 10 is in the default position.

Figure 2C:
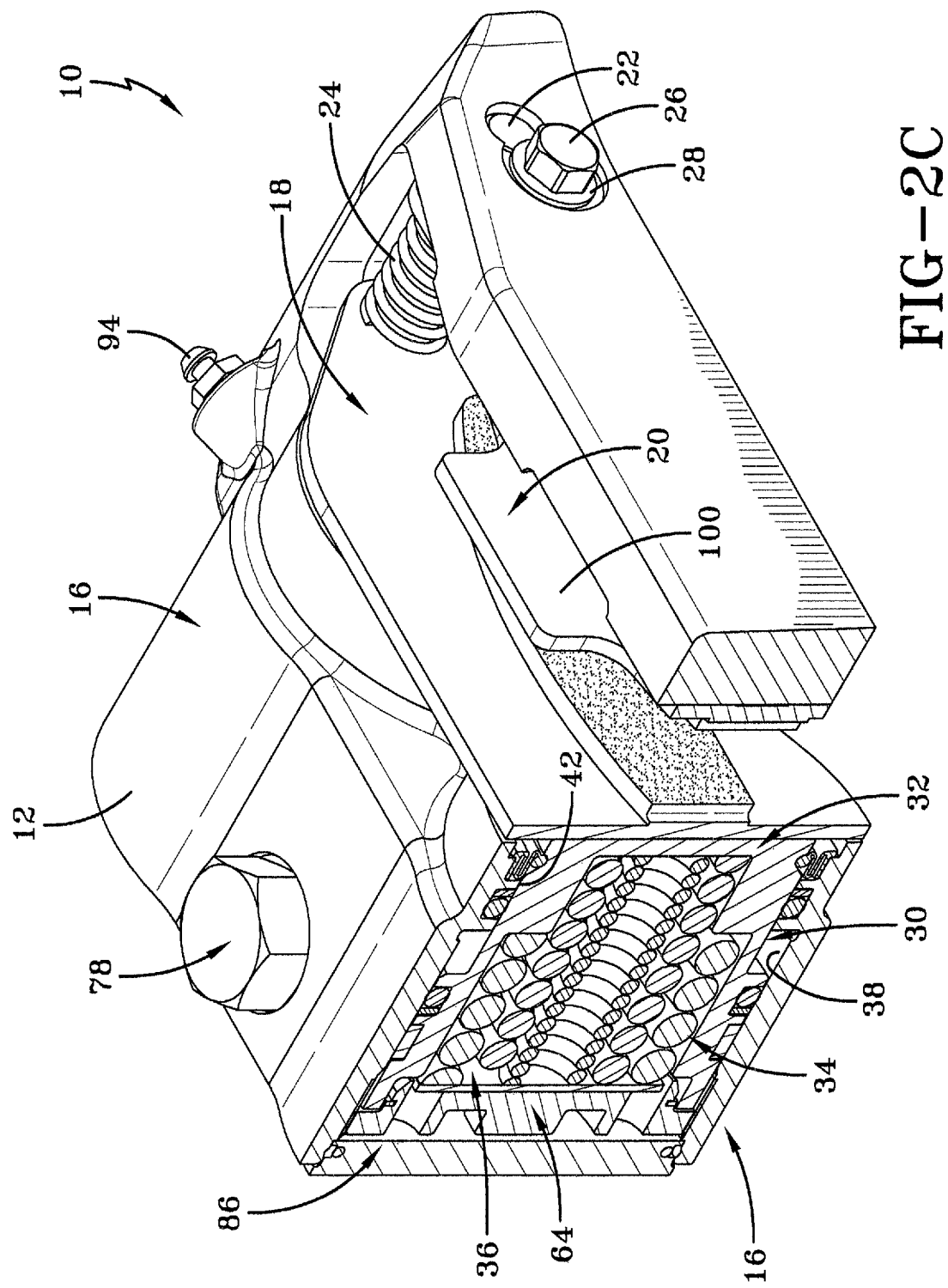
FIG. 2C is a sectional perspective view about line 2C-2C from FIG. 2A showing a piston assembly of the spring applied hydraulic released brake according to the concepts of the present invention.
Figure 2D:
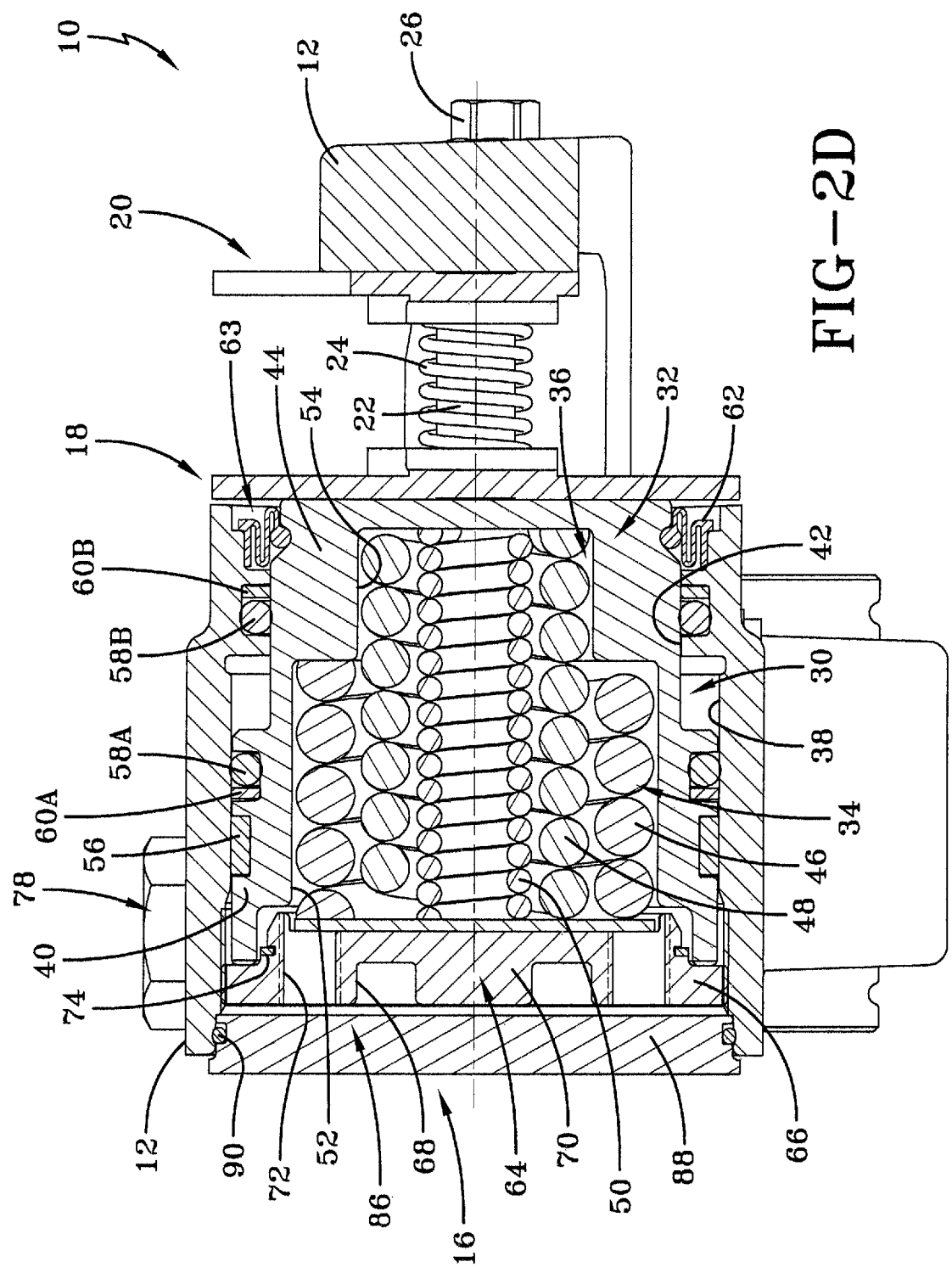
FIG. 2D is a sectional plan view about line 2C-2C from FIG. 2A showing the piston assembly according to the concepts of the present invention.

As mentioned above, housing 12 includes a pair of piston-spring assemblies 16 in a first portion thereof. As best seen in FIGS. 2C and 2D, each piston-spring assembly 16 is within a respective piston cavity 30 of housing 12. Piston-spring assembly 16 includes a piston assembly 32, which may be described as piston 32, slideable within piston cavity 30. As suggested above, a spring assembly 34 within an inner bore 36 of piston 32 causes piston 32 to engage first stator assembly 18 in a default position of SAHR brake 10 to thereby achieve a braking function. The spring force of spring assembly 34 is overcome to release the braking function, as will be further discussed herein below.

In the configuration shown in the Figures, piston cavity 30 includes a wider bore portion 38 particularly receiving a wider body portion 40 of piston 32, and a narrower bore portion 42 particularly receiving a narrower body portion 44 of piston 32. This shape, which may be said to be a telescoping shape, allows hydraulic fluid to particularly act on wider body portion 40 of piston 32 to thereby release the braking function of piston 32.

Figure 4A:
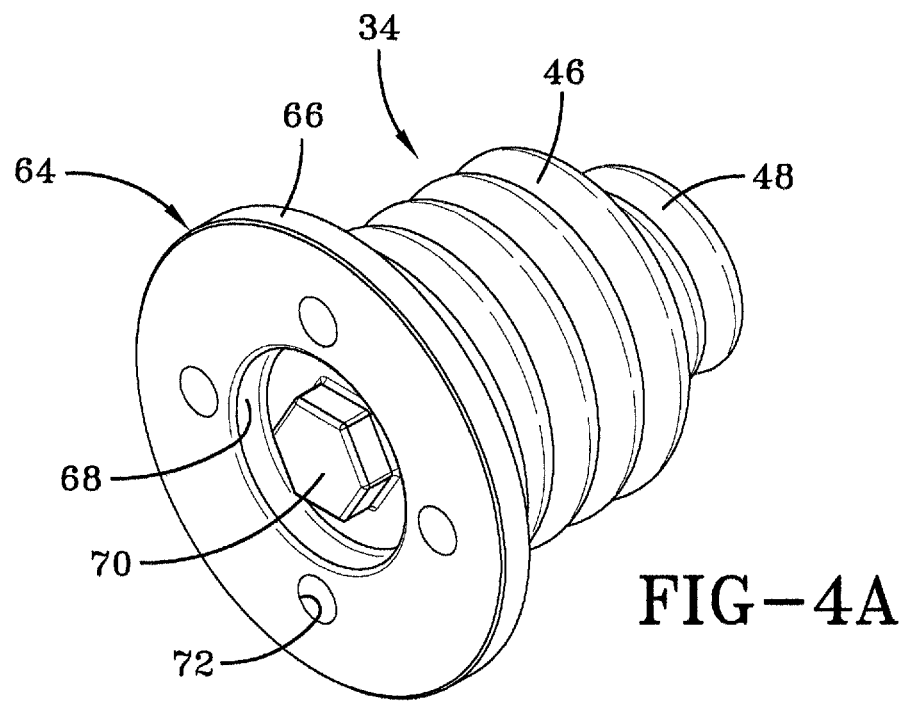
FIG. 4A is a perspective front view of an end cap adjuster and springs of the spring applied hydraulic released brake according to the concepts of the present invention.
Figure 4B:
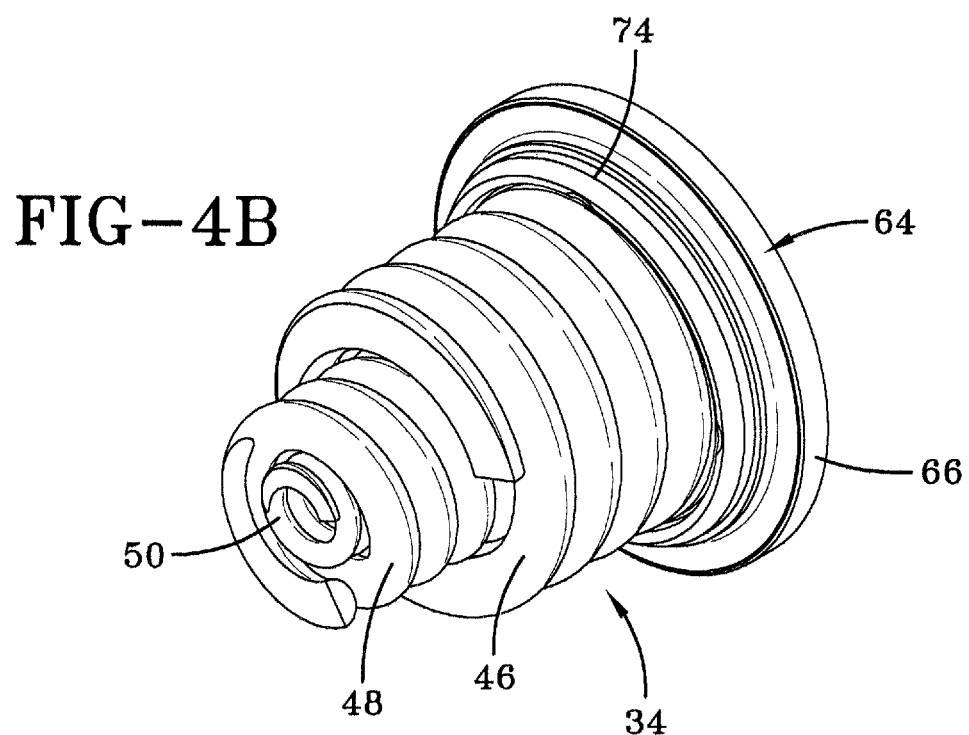
FIG. 4B is a perspective rear view of the end cap adjuster and the springs according to the concepts of the present invention.

As discussed above, and as perhaps best seen in FIG. 2D, inner bore 36 of piston 32 receives spring assembly 34. Spring assembly 34 (also seen in FIGS. 4A and 4B) may include any suitable number of springs, though the Figures show SAHR brake 10 with three springs of differing diameters. The three springs include an outer spring 46, intermediate spring 48, and inner spring 50. Springs 46, 48, 50 are circumferentially positioned within inner bore 36 of piston 32 and are positioned on a common central axis, Outer spring 46 and portions of intermediate spring 48 and inner spring 50 are within a wider portion 52 of inner bore 36. The other portions of intermediate spring 48 and inner spring 50 are within a narrower portion 54 of inner bore 36.

With reference still to FIG. 2D, piston-spring assembly 16 may include a variety of piston sealing components with piston 32. A wear ring 56 and a combination of O-ring 58A and a backup ring 60A may be provided within wider body portion 40 of piston 32. A combination of O-ring 58B and a backup ring 60B may be provided within a groove of housing 12 and around narrower body portion 44 of piston 32. A piston boot 62 may be around a nose of piston 32 and within a piston boot groove 63 in housing 12. Piston boot 62 is a secure fit, which may also be described as pressed in, within piston boot groove 63. Piston boot 62 may include a ring insert, which may also be described as a 'steel can' portion, and a corrugated portion, which may be made from silicone or rubber, secured to the ring insert. This configuration of piston boot 62 secures the fit of piston boot 62 within piston boot groove 63. The combination of the piston sealing components generally serves to preclude entry of foreign matter, provide suitable clearance, and prevent the escape of fluid.

With further reference to spring assembly 34, shown in FIGS. 2C, 2D, 4A, and 4B, an end of spring assembly 34 abuts an end cap adjuster 64. End cap adjuster 64 provides an opposing surface against which springs 46, 48, 50 are biased as to apply spring force against first stator assembly 18 through narrower body portion 44 of piston assembly 32. End cap adjuster 64 includes a body portion 66 with a central cavity 68 therewithin.

End cap adjuster 64 may be adjusted, and therefore alter the resistance against springs 46, 48, 50, by providing threading around the outer perimeter of body portion 66. This threading of body portion 66 generally corresponds with threading within piston cavity 30.

End cap adjuster 64 may be adjusted about this threading by a user utilizing a tool with a hex head 70 extending from body portion 66 and into central cavity 68. Hex head 70 provides a convenient shape to allow a user to adjust end cap adjuster 64, though other shapes may be suitable.

End cap adjuster 64 may also be adjusted about this threading by a user utilizing a plurality of threaded holes 72 within body portion 66. Should a user not desire using hex head 70, or should a user require additional torque, a user can insert threaded articles into at least two of holes 72 and then use a tool with the threaded articles to adjust end cap adjuster 64.

Body portion 66 includes an indicator portion 74. Indicator portion 74, which may be a back-up ring 74 or a painted portion 74, provides a contrast color with respect to body portion 66, such that a user may view indicator portion 74 to determine whether end cap adjuster 64 and piston-spring assembly 16 are in need of adjustment. The contrast color of indicator portion 74 may be white against a darker color, such as gray or black, of body portion 66. In one or more embodiments, indicator portion 74 may be made from white polytetrafluoroethene, generally known by the trade name Teflon.

Figure 2E:
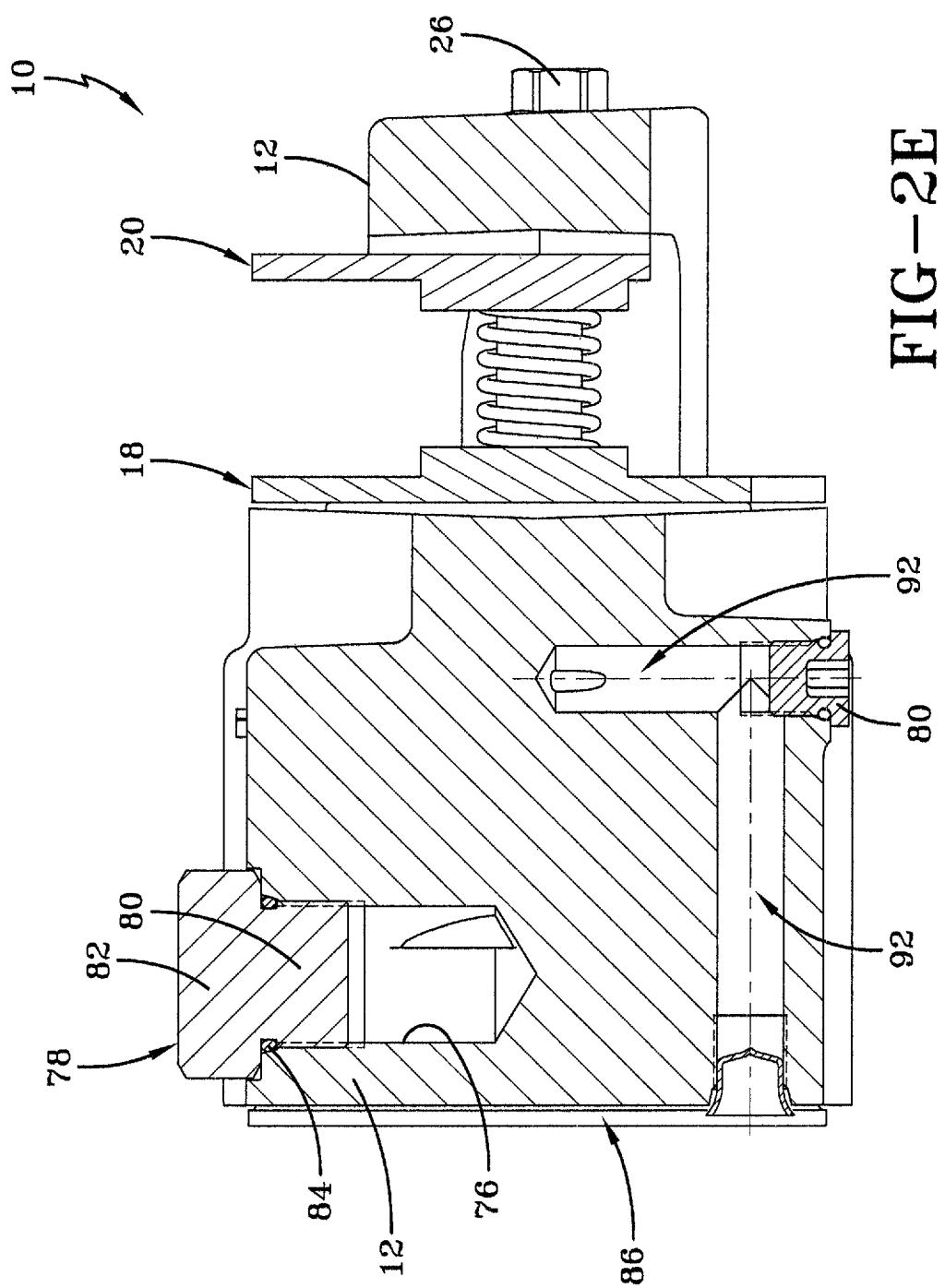
FIG. 2E is a sectional plan view about line 2E-2E from FIG. 2B showing a hydraulic fluid system, a site plug, and a site hole of the spring applied hydraulic released brake according to the concepts of the present invention.

Referring now to FIG. 2E, a user is able to view indicator portion 74 by way of a view port 76. View port 76 is concealed underneath a site plug 78 maintained by housing 12 between piston-spring assemblies 16. In standard operation of SAHR brake 10, view port 76 includes site plug 78 sealed or threaded therein such that hydraulic fluid does not escape housing 12 during normal operation of SAHR brake 10. When a user desires to view indicator portion 74 during an inspection operation or maintenance operation of SAHR brake 10, the hydraulic fluid may be released, which may be by way of removing a fluid drain plug 80, and site plug 78 is removed from view port 76. The user can then look into view port 76 to determine the amount of indicator portion 74 that is visible. Appropriate adjustment of end cap adjuster 64 and piston-spring assembly 16 may then be made, as necessary.

Adjustment of end cap adjuster 64 may occur based on a user optimizing and maximizing the runtime of stator pads 98A, 98B, which are further discussed herein. End cap adjuster 64 may be set at an initial position such that spring assemblies 34 provide an initial spring force to first stator assembly 18. As stator pads 98A, 98B wear, spring assemblies 34 would need to provide additional spring force in order to maintain a similar braking force as the initial operation. Adjusting end cap adjuster 64 toward spring assembly 34 serves to provide this additional spring force. This adjustment process can be repeated until stator pads 98A, 98B require replacement.

Site plug 78 may be of any suitable shape. In the configuration as shown in FIG. 2E, site plug 78 includes a body portion 80 extending from a hex head 82. Hex head 82 provides a convenient shape to allow a user to remove site plug 78, though other shapes may be suitable. An O-ring 84 may be provided between body portion 80 and hex head 82.

With further description of piston-spring assembly 16, and with reference again to FIG. 2D, for retaining end cap adjuster 64, piston 32, and spring assembly 34 within housing 12, an end cap 86 is secured within an end opening of housing 12. End cap 86 has a cylindrical body 88 that telescopes into the end opening of housing 12 such that at least a portion of an outer surface of cylindrical body 88 engages at least a portion of an inner surface of the end opening of housing 12. End cap 86 may have an O-ring 90 positioned around cylindrical body 88 to keep end cap 86 from pushing out of the back of the end opening of housing 12. The groove of end cap 86 where O-ring 90 is positioned and a corresponding groove in the end opening of housing 12 have sufficient interference as to suitably secure end cap 86 within the end opening of housing 12.

As said above, since SAHR brake 10 is of a spring applied, hydraulically released configuration, piston-spring assemblies 16 enact a braking function in a default position of SAHR brake 10. This default position is released by supplying hydraulic fluid pressure to housing 12. To receive this hydraulic fluid pressure, housing 12 includes a hydraulic fluid supply network 92, which may also be described as fluid chamber 92, for receiving hydraulic fluid from a fluid source by one or more inlet ports 94, seen in FIGS. 1B, 1D, and 2E. Ports 94 may also be used for bleeding air from hydraulic fluid supply network 92. By way of hydraulic fluid supply network 92 and ports 94, piston assemblies 32 may be in fluid communication with the source of hydraulic fluid.

To release SAHR brake 10, hydraulic fluid is initiated or delivered into fluid chamber 92. Hydraulic fluid fills fluid chamber 92 and begins to increase in pressure. Once sufficient hydraulic fluid pressure is supplied to fluid chamber 92, piston 32 is able to overcome the spring force of spring assembly 34, thereby causing piston 32 to travel away from first stator assembly 18. This disengages first stator assembly 18 from rotor 14 to disengage SAHR brake 10. The hydraulic fluid pressure acts on piston 32 in an area of fluid chamber 92 generally corresponding with the location of the arrow 30 showing piston cavity 30. SAHR brake 10 can be re-engaged when desired by a user allowing the pressure of the hydraulic fluid to release to "zero" such that spring assembly 34 re-engages piston 32 with first stator assembly 18.

Figure 3A:
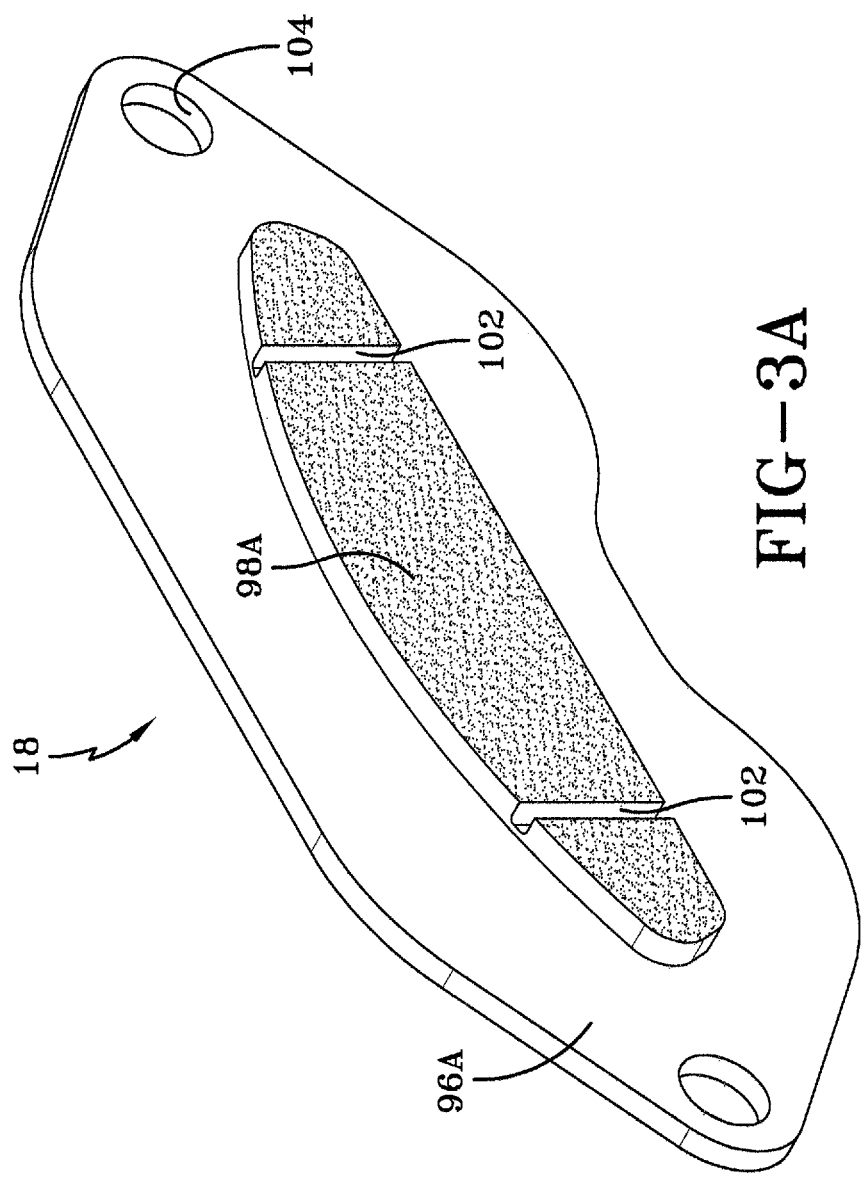
FIG. 3A is a perspective view of a first stator assembly of the spring applied hydraulic released brake according to the concepts of the present invention.

With further description of first stator assembly 18 and second stator assembly 20, and with particular reference to FIGS. 3A and 3B, first stator assembly 18 and second stator assembly 20, which may also be described as stator pad assemblies, include a respective backing plate 96A, 96B. Backing plate 96A may approximate the outer perimeter of the first portion of housing 12 and backing plate 96B may approximate the outer perimeter of the second portion of housing 12, though backing plate 96B may include a tab 100 extending beyond this outer perimeter of the second portion of housing 12, as discussed further herein below.

Backing plates 96A, 96B carry a respective stator lining 98A, 98B, which may also be described as stator pads. Stator pad 98A, 98B may be secured to backing plate 96A, 96B by way of an adhesive or other generally known means. Installation of stator pads 98A, 98B may include utilizing integral molding holes within backing plates 96A, 96B. Integral molding holes may generally serve as anchor points for stator pad 98A, 98B material. Stator pads 98A, 98B face inward toward each other and may be generally aligned with the centerline of piston assemblies 32.

Backing plate 96B of second stator assembly 20 may include tab 100 as an extension of backing plate 112. Tab 100 may assist with ease of servicing stator assembly 20, as tab 100 extends far enough as to be outside of an outer perimeter of housing 12. This extension of tab 100 outside of housing 12 enables tab 100 to be easily grabbed by a user for rotation and/or removal of stator assembly 20. Tab 100 may be particularly positioned centrally with respect to the width of backing plate 96B. In one or more embodiments, housing 12 may include a depression generally corresponding to the position of tab 100, such that tab 100 serves as an even longer extension from housing 12.

Stator pads 98A, 98B may include one or more wear slots 102 formed therein. Wear slots 102 may be useful for assisting a user with knowing when stator pads 98A, 98B need repaired or replaced. Any suitable number of wear slots 102 may be utilized. Stator pads 98A, 98B include two wear slots 102—one wear slot on each side.

As shown in FIGS. 3A and 3B, wear slots 102 may extend entirely through the height or length of stator pads 98A, 98B. In other embodiments, wear slots 102 do not extend all the way through the height or length of stator pads 98A, 98B. As shown in FIGS. 3A and 3B, wear slots 102 may not extend all the way through the depth or thickness of stator pads 98A, 98B. In other embodiments, wear slots 102 do extend all the way through the depth or thickness of stator pads 98A, 98B. Wear slots 102 are shown as linear shaped, but other suitable configurations may be utilized. Wear slots 102 may be of a generally narrow configuration.

In operation of SAHR brake 10, stator pads 98A, 98B will wear and become less thick. Thus, wear slots 102 will become less deep. During operation of SAHR brake 10, wear slots 102 will be worn from the original depth to a subsequent depth. Wear slots 102 may be designed for a particular depth, such that a user will be able to identify, based on the subsequent depth, that stator pads 98A, 98B should be replaced. Stator pads 98A, 98B can be replaced by a user upon this identification. Wear slots 102 may also be helpful for controlling vibration and noise of SAHR brake 10.

In the configuration of SAHR brake 10, when stator assemblies 18, 20 require servicing, the hydraulic fluid is not pressurized, which may be described as the fluid supply being off. As discussed above, this puts SAHR brake 10 in a default position and allows a user to inspect indicator portion 74. To remove stator assemblies 18, 20, the default braking function must be disengaged. This may include adjusting end cap adjuster 64 such that stator assemblies 18, 20 are disengaged from rotor 14. After this, one of the torque pins 22 may be removed from the respective torque pin holes 104 of stator assemblies 18, 20 and the respective torque pin holes within housing 12. This may also include removing respective spring 24 positioned between stator assemblies 18, 20.

Stator assemblies 18, 20 may then be rotated about the other torque pin 22 (and spring 24) that remains within housing 12. Stator assemblies 18, 20 may be rotated away (not shown) from housing 12 of SAHR brake 10 such that they can be accessed by a user for performing maintenance thereon. This maintenance may include replacing stator linings 98A, 98B. In other embodiments, both of the torque pins 22 and both of the springs 24 may be removed to completely remove stator assemblies 18, 20 from SAHR brake 10. Once maintenance of stator assemblies 18, 20 is completed, stator assemblies 18, 20 may be reassembled with SAHR brake 10 in a reverse manner as described above.

As perhaps best seen in FIG. 2A, for assistance with maintenance of stator assemblies 18, 20 housing 12 includes a recess 106 positioned over stator assemblies 18, 20. This may also be described as housing 12 not including a bridge positioned over stator assemblies 18, 20. Other generally known brakes may include a housing having a bridge over the stator assemblies, which bridge may serve certain functions for those particular brakes. Here, with housing 12 including recess 106, a user is able to more easily access stator assemblies 18, 20 as there is nothing obstructing access to stator assemblies 18, 20 from this location, which may be described as the top, of housing 12.

With particular reference to FIG. 1D, for locating SAHR brake 10 in operative relation to rotor 14, housing 12 may further include a pair of mounting assemblies 108. Each mounting assembly 108, which may also be referred to as mounting ear 108, includes a projecting arm 110, which may be generally circular shaped, having a hole 112 therethrough for receiving a fastener 114. Fastener 114 mounts SAHR brake 10 to a bracket assembly 116, which includes a mounting protrusion 118 having a mounting hole 120 therethrough. Mounting hole 120 includes threading 122 generally corresponding to threading 124 of a threaded portion 126 of fastener 114. Threaded portion 126 may extend from a fastener body 128 that may include a hex head 130 thereon.

Projecting arm 110 of mounting ear 108 may include a sleeve 132 for providing a secure fit of fastener 114. With fastener 114 in place, sleeve 132 is positioned around fastener body 128. Sleeve 132 may also be positioned around a portion of threaded portion 126.

As seen in FIG. 1D, sleeve 132 includes an overlap portion 134 adapted to fit within hole 120 when fastener 114 secures mounting assembly 108 with mounting protrusion 118. In one or more embodiments, overlap portion 134 may be about ⅛ inches in length.

As shown in FIG. 1B, it may be desirable to hang SAHR brake 10 from rotor 14 about one of the mounting assemblies 108. With reference to FIG. 1D, to achieve this hanging position, a user may grasp sleeve 132 to thereby cause overlap portion 134 to be removed from hole 120. Without fastener 114 in position and without overlap portion 134 in hole 120, the unsecured mounting assembly 108 is clear of bracket assembly 116. Thus, SAHR brake 10 is able to swing freely about the secured mounting assembly to thereby hang from bracket assembly 116 by the secured mounting assembly 108 in the position shown in FIG. 1B.

To assist with the function of sleeve 132, mounting assembly 108 may further include an outer sleeve 136 positioned around a portion of sleeve 132. Outer sleeve 136 may include piston boots 138A, 138B positioned at each end thereof. Piston boots 138A, 138B may include a ring insert, which may also be described as a 'steel can' portion, and a corrugated portion, which may be made from silicone or rubber, secured to the ring insert. Outer sleeve 136 and piston boots 138A, 138B generally allow sleeve 132 to travel just enough to cause overlap portion 134 to be removed from hole 120 without allowing sleeve 132 to travel too far.

It is thus evident that a spring applied hydraulic released brake constructed as described herein accomplishes the objects of the present invention and otherwise substantially improves the art.

What is claimed is:

1. A spring applied hydraulic released caliper brake comprising
    a caliper brake housing including
        a pair of stator assemblies,
        a pair of piston-spring assemblies, each of the piston-spring assemblies including
            a piston assembly,
            a spring assembly adapted to apply spring force to the piston assembly to thereby engage the piston assembly with a first stator assembly of the pair of stator assemblies in a default position of the brake, and
            an end cap adjuster providing an opposing surface against which the spring assembly is biased, the end cap adjuster including
                a body portion having an end cap threading therearound generally corresponding with a housing threading within the caliper brake housing,
    the caliper brake housing further including a view port with a site plug adapted to prevent fluid escape from the view port during normal operation of the brake, wherein the site plug is removable from the view port during an inspection operation of the brake, wherein the site plug is maintained by the caliper brake housing during normal operation in a position between the pair of piston-spring assemblies such that a user can view a portion of the pair of piston-spring assemblies during the inspection operation of the brake, and wherein the site plug is radially positioned relative to the pair of piston-spring assemblies.

2. The spring applied hydraulic released brake of claim 1, further comprising a pair of end caps for retaining the pair of piston-spring assemblies,
    the body portion of the end cap adjuster further including
        a central cavity therewithin, and
        a hex head unitary with the body portion and extending from the body portion into the central cavity.

3. The spring applied hydraulic released brake of claim 1, the body portion of the end cap adjuster further including
    a plurality of threaded holes therewithin.

4. The spring applied hydraulic released brake of claim 1, the caliper brake housing further including a pair of mounting assemblies adapted to secure the brake with a bracket assembly,
    the bracket assembly including a mounting protrusion having a mounting hole therethrough, each of the mounting assemblies of the pair of mounting assemblies including a sleeve adapted to receive a respective fastener for securing the mounting assemblies with the mounting holes of the bracket assembly.

5. The spring applied hydraulic released brake of claim 4, each of the sleeves including an overlap portion positioned within the respective mounting hole when the respective fastener is within the respective mounting hole and the sleeve.

6. A spring applied hydraulic released brake comprising a brake housing including
 a pair of stator assemblies,
 a pair of piston-spring assemblies, each of the piston-spring assemblies including
  a piston assembly,
  a spring assembly adapted to apply spring force to the piston assembly to thereby engage the piston assembly with a first stator assembly of the pair of stator assemblies in a default position of the brake, and
  an end cap adjuster providing an opposing surface against which the spring assembly is biased, the end cap adjuster including
   a body portion having an end cap threading therearound generally corresponding with a housing threading within the brake housing,
 the brake housing further including a view port with a site plug adapted to prevent fluid escape from the view port during normal operation of the brake, wherein the site plug is removable from the view port during an inspection operation of the brake,
 the body portion being of a first color, wherein the body portion of the end cap adjuster includes an indicator portion that is of a contrast color with respect to the first color of the body portion, wherein the indicator portion is viewable from the view port when the site plug is removed from the view port during an inspection operation of the brake.

7. The spring applied hydraulic released brake of claim 6, wherein the contrast color is white and the first color of the body portion is gray or black.

8. The spring applied hydraulic released brake of claim 6, wherein the indicator portion is made from white polytetrafluoroethene.

9. A method of servicing the spring applied hydraulic released brake of claim 6, the method comprising steps of
 providing the spring applied hydraulic released brake,
 removing the site plug from the view port to thereby observe the indicator portion, and
 adjusting the end cap adjuster based on the observation of the indicator portion.

\* \* \* \* \*